US012704597B1

(12) United States Patent
Foster

(10) Patent No.: US 12,704,597 B1
(45) Date of Patent: Aug. 11, 2026

(54) PROCESSING SENSOR DATA FOR NEURAL NETWORKS

(71) Applicant: GM Cruise Holdings LLC, San Francisco, CA (US)

(72) Inventor: Paul Carrington Foster, Mountain View, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 367 days.

(21) Appl. No.: 18/468,635

(22) Filed: Sep. 15, 2023

(51) Int. Cl.
*G01S 7/41* (2006.01)
*G01S 13/86* (2006.01)
*G01S 17/86* (2020.01)

(52) U.S. Cl.
CPC ............ *G01S 7/417* (2013.01); *G01S 13/865* (2013.01); *G01S 17/86* (2020.01)

(58) Field of Classification Search
CPC ......... G01S 7/417; G01S 17/86; G01S 13/865
See application file for complete search history.

(56) References Cited

U.S. PATENT DOCUMENTS

2019/0385005 A1* 12/2019 Yang ...................... G06N 5/046
2021/0150812 A1* 5/2021 Su ........................ G06N 3/0499
2022/0057487 A1* 2/2022 Khairmode ........... G01S 13/931
2022/0391172 A1* 12/2022 Imber .................... G06N 3/045

* cited by examiner

*Primary Examiner* — William Kelleher
*Assistant Examiner* — Hailey R Le
(74) *Attorney, Agent, or Firm* — CANTOR COLBURN LLP

(57) ABSTRACT

Systems and techniques are disclosed for processing sensor data for neural networks. An example method can include receiving, from one or more sensors, one or more slices of a data frame, and wherein the one or more slices are captured sequentially by the one or more sensors; generating a mapping of operations identifying a set of operations to be applied by a neural network to the one or more slices as the one or more slices are received by the neural network and a set of dependencies for the set of operations; transmitting the one or more slices and the mapping of operations to the neural network; and processing, via the neural network, the one or more slices based on the mapping of operations.

20 Claims, 6 Drawing Sheets

PROCESSING SENSOR DATA FOR NEURAL NETWORKS

BACKGROUND

1. Technical Field

The present disclosure generally relates to processing sensor data for neural networks. For example, aspects of the present disclosure relate to techniques and systems for improving the efficiency and latency of processing sensor data for neural networks.

2. Introduction

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow the devices to obtain sensor data that measures, describes, and/or depicts one or more aspects of an event, condition, and/or target such as an object, a scene, a surface, and/or a person, among others. For example, an image sensor of a camera device can be used to capture frames (e.g., video frames and/or still pictures/images) depicting a target(s) from any electronic device equipped with an image sensor. As another example, a light ranging and detection (LIDAR) sensor can be used to determine ranges (variable distance) of one or more targets by directing a laser to a surface of an entity (e.g., a person, an object, a structure, an animal, etc.) and measuring the time for light reflected from the surface to return to the LIDAR. The sensor data can be processed by one or more algorithms to derive an output such as, for example, a prediction or estimate, a decision, a content item, a plan, an instruction, etc.

BRIEF DESCRIPTION OF THE DRAWINGS

Illustrative embodiments of the present application are described in detail below with reference to the following figures.

DETAILED DESCRIPTION

Figure 1:
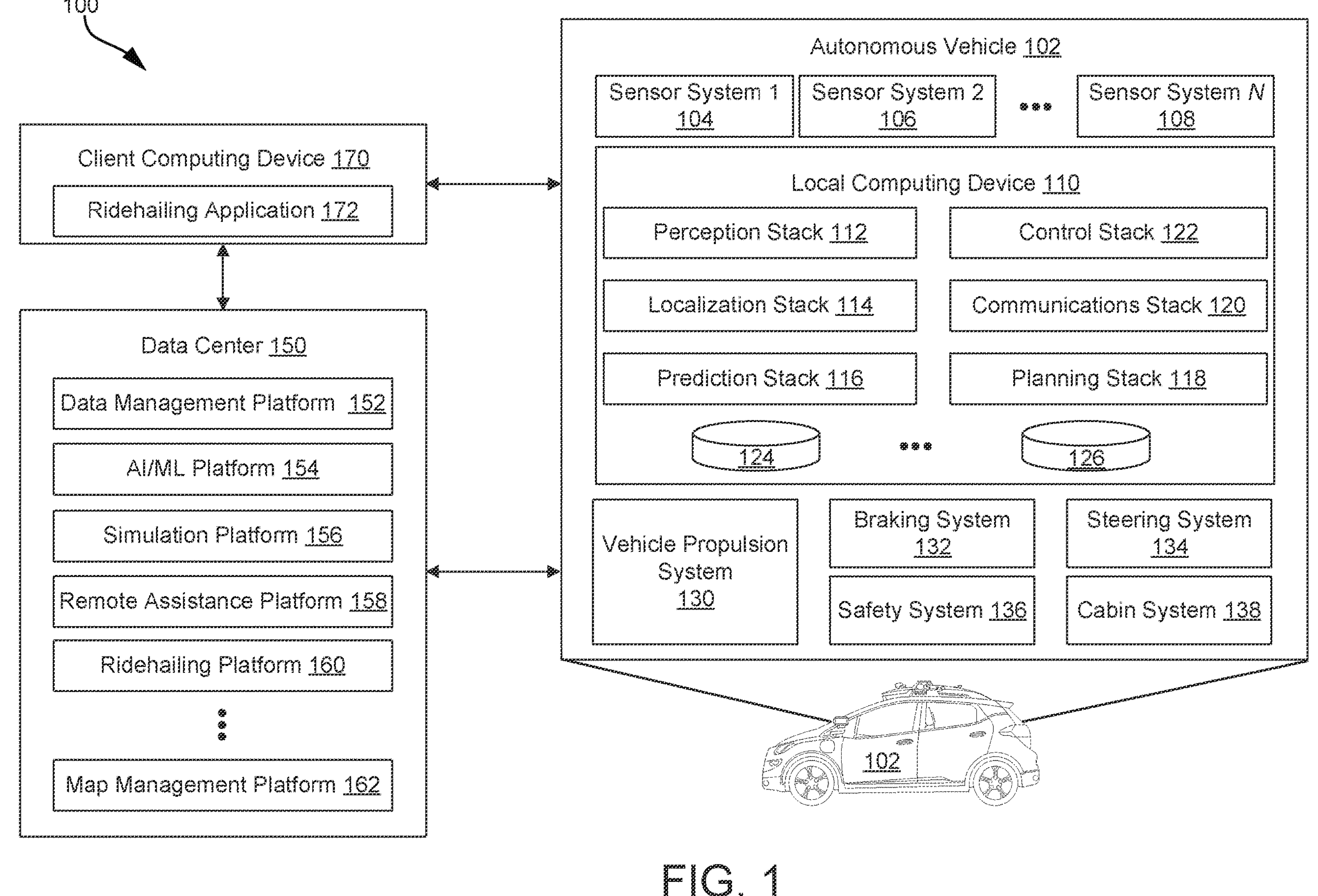
FIG. 1 illustrates an example system environment that can be used to facilitate autonomous vehicle (AV) navigation and routing operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow the devices to obtain sensor data that measures, describes, and/or depicts one or more aspects of an event, condition, and/or target such as an object, a scene, a surface, and/or a person, among others. For example, an image sensor of a camera device can be used to capture frames (e.g., video frames and/or still pictures/images) depicting a target(s) from any electronic device equipped with an image sensor. As another example, a light ranging and detection (LIDAR) sensor can be used to determine ranges (variable distance) of one or more targets by directing a laser to a surface of an entity (e.g., a person, an object, a structure, an animal, etc.) and measuring the time for light reflected from the surface to return to the LIDAR. The sensor data can be processed by one or more algorithms to derive an output such as, for example, a prediction or estimate, a decision, a content item, a plan, an instruction, etc. Moreover, the sensor data can be used in a variety of use cases and applications, such as automation, robotics, smart devices, Internet-of-Things (IOT) devices, and camera systems, among others. One example use case for sensor data and algorithms for processing sensor data, such as machine learning models, is autonomous vehicles.

Autonomous vehicles (AVs), also known as self-driving cars, driverless vehicles, and robotic vehicles, are vehicles that use sensors to sense the environment and navigate the environment without human input (or with minimal human input). Automation technologies enable AVs to drive on roadways and perceive the surrounding environment accurately and quickly, including obstacles, signs, road users and vehicles, traffic lights, semantic elements, boundaries, among others. In some cases, AVs can be used to pick-up passengers and/or cargo and drive the passengers and/or cargo to selected destinations.

An AV can include various types of sensors such as, for example and without limitation, a camera sensor, a light detection and ranging (LiDAR) sensor, a radio detection and ranging (RADAR) sensor, an acoustic sensor (e.g., an ultrasonic sensor, a microphone, etc.), an inertial measurement unit (IMU), among others. The AV can use such sensors to collect data and measurements in a driving environment, which the AV can use to perform AV operations such as navigation. The sensors can provide the data and measurements to an internal computing system of the AV that can use the data and measurements to control a mechanical system of the AV, such as a vehicle propulsion system, a braking system, or a steering system.

As discussed above, AVs can employ a combination of sensors including, but not limited to, LiDAR, RADAR, and cameras to navigate and interact with their surrounding environment (e.g., real world environment). By way of example, LiDAR can use pulsed laser light to create a detailed 3D map (e.g., a point cloud) of the vehicle's surroundings, enabling it to detect and avoid obstacles and understand (e.g., via the perception layer) the environment with high precision. The RADAR sensor can utilize radio waves to measure the distance, angle, and velocity of surrounding objects. In some cases, a RADAR sensor may assist the AV under conditions of poor visibility such as fog, rain, or darkness where other sensors like cameras and LiDAR might be less effective. An AV may use cameras to capture visual data (e.g., in the form of RGB images or video streams) for object detection and recognition, lane tracking, and traffic sign interpretation.

In some examples, neural networks can be implemented to process sensor data, such as data from a LiDAR, RADAR, and/or camera. For example, an AV may include one or more neural networks that can process and interpret the sensor data to understand and interact with the environment, enabling tasks such as, without limitation, object detection, classification, planning, navigation, tracking and trajectory prediction. Neural networks can utilize sensor data to make driving decisions such as when to accelerate, brake, turn, or navigate through traffic. In some aspects, the various sensor sources (e.g., cameras, LiDAR, and RADAR) may provide a different perspective on the AV's surroundings (e.g., driving environment). For example, cameras can capture visual data that neural networks (e.g., Convolutional Neural Networks (CNNs)) may process to perform one or more tasks such as, without limitation, detecting and classifying objects, recognizing objects and scene elements (e.g., lane markings, traffic signals, road features, obstacles, etc.), and interpret traffic signs. The LiDAR sensors may generate a point cloud, such as a three-dimensional (3D) point cloud, of the AV's environment and generate data which may be transformed and interpreted by one or more neural networks for one or more tasks such as, for example and without limitation, object detection, classification, planning, navigation and routing, recognition, prediction, tracking and motion estimation. Similarly, RADAR data may be leveraged by neural networks to ascertain object distances and velocities. By processing and combining different sensor inputs, neural networks can help AVs understand their environment, predict the behavior of other road users, and make accurate and efficient driving decisions, for example.

In some cases, the one or more neural networks can process sensor data through a series of interconnected layers where each layer can perform a specific transformation or computation on the data. For example, when data enters the neural network (e.g., an image from a camera, a point cloud from a LiDAR, or a signal from a RADAR), the data may first be processed by an input layer of the neural network. In some instances, different preprocessing steps/tasks may be performed on different types of sensor data before such sensor data is fed into the neural network. By way of example, images may be resized and normalized before it is fed into a neural network, while LiDAR data may be converted into a grid or voxel format before it is fed into the neural network. The input data may then be propagated through the hidden layers of the neural network. In each layer of the neural network, the data can be transformed by a set of weights, biases, and activation functions. The weights and biases can include learned parameters, optimized during the training phase to minimize the discrepancy between the neural network's predictions and the actual (e.g., ground truth) data. Activation functions may introduce non-linearities into the model (e.g., the neural network model), enabling the model to learn complex patterns and relationships in the data.

In a CNN, which can accurately and effectively process image data, the layers may include one or more convolutional layers, pooling layers, and fully connected layers. In some aspects, convolutional layers can apply a set of learnable filters to the input, pooling layers may reduce the spatial dimensions while retaining important information, and fully connected layers can combine features to make final predictions. For example, with LiDAR data, three-dimensional CNNs or architectures can be used which are capable of processing point cloud data. The output layer of the neural network may then produce the final predictions or decisions, such as the classes and locations of detected objects (e.g., people, object types on the road where the AV is navigating), the estimated trajectory of the AV, or the appropriate driving action to take.

In some examples, during the training phase, the neural network can learn from labeled ground truth data. The discrepancy between the neural network's output and the ground truth may be calculated using a loss function, and the network's parameters (e.g., weights and biases) may be updated using an optimization algorithm such as a stochastic gradient descent, in a process called backpropagation. In some cases, the aim is to adjust the parameters so that the neural network can make accurate predictions when new and unseen data is presented to it.

In some aspects, neural networks may receive sensor data (e.g., LiDAR, camera, RADAR) in pieces (e.g., a portion of the sensor data frame such as a data slice) as it is captured from the surrounding environment. In AV applications, the neural networks of an AV may receive the sensor data in pieces as it is captured while the AV is autonomously navigating. For example, a data captured by a camera can include a frame (e.g., a video frame, a still picture/image, etc.), which can include for example an array of pixels with each pixel including color and brightness information), and a slice (also portion or data slice) of the frame may include one or more rows of pixels. For other sensors (e.g., LiDAR, RADAR), a data frame may represent data captured by the sensor's surrounding environment at a specific moment in time. Generally, a neural network may until it receives an entire data frame or package (e.g., from one or more sensors) before it starts processing the data. Consequently, this may add latency to the computation process within a neural network. By way of example, there may be one frame of latency as a sensor outputs the frame and another frame of latency as the frame is processed by the neural network for a total of at least two frames of latency. However, for a variety of reasons such as data and operation dependencies, the neural network may need to wait until it receives an entire data frame or package before it begins processing the data (e.g., rather than processing portions or slices of the data as it is generated and/or received).

To improve the latency and efficiency of a neural network in processing sensor data, it would be beneficial for a neural network to process sensor data as it is collected, generated, and/or received, prior to receiving a full frame/package of data (e.g., from a LiDAR, a camera, a RADAR, etc.) rather than delaying the processing of sensor data associated with the full frame/package of data until it receives the full frame/package of data. In some examples, a slice of a data frame (e.g., a line, portion, or subset of data from a frame such as an image from a camera) from a sensor (e.g., LiDAR, camera, RADAR, etc.), such as an AV sensor, and information, such as an operations table (e.g., a mapping of operations), that describes what operations to be applied to that slice and the dependencies (e.g., the operations to be performed for the slice, the order of the operations to be performed for the slice, parameters needed to process the slice, data that may or may not be needed to process the slice, etc.) for processing that slice can be sent (e.g., via a loader of a front-end system) to the neural network (e.g., rather than waiting for the whole frame to arrive from the sensor) for processing by the neural network. This process may apply for subsequent slices of data. The neural network can use such information (e.g., the information that describes the operations, dependencies, etc., such as an operations table) to process slices of sensor data as they are received rather than waiting for all of the slices of sensor data associated with a frame or package of sensor data. In some aspects, illustrative examples of the types of operations and/or layers that the neural network may perform and/or implement to process sensor data as part of a task (e.g., object detection and classification, planning, routing/navigation, prediction, tracking, recognition, etc.) may include, but are not limited to, preprocessing, convolution, pooling operations, non-linear activation functions, fully connected layers, output prediction, loss calculation, and back propagation. Those skilled in the art will appreciate all the types of operations that may be performed by a neural network for sensor data.

Examples of the systems and techniques described herein are illustrated in FIG. 1 through FIG. 6 and described below. While the systems and techniques are described below in the context of neural networks and sensor data implemented by autonomous vehicles, the systems and techniques described herein can be implemented in any other context (e.g., use case, application, scenario, purpose, etc.) such as, for example and without limitation, other automation contexts, camera systems, smart devices, IOT devices, transportation systems and/or platforms (e.g., aircrafts, drones, trains, submarines, boats, other vehicles, elevators, etc.), extended reality systems (e.g., virtual reality systems, augmented reality systems, video-passthrough systems, mixed reality systems, etc.), and/or robotics, among others. The autonomous vehicle context for implementing the systems and techniques described herein is merely one illustrative example context provided for explanation purposes.

FIG. 1 illustrates an example of an AV environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are not limiting and provided for explanation purposes. Other examples may include different numbers and/or types of elements, but one of ordinary skill in the art will appreciate that such variations do not depart from the scope of the present disclosure.

In this example, the AV environment 100 includes an AV 102, a data center (also autonomous vehicle fleet management device, autonomous vehicle fleet management system, management system) 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise inertial measurement units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LiDAR system, and the sensor system 108 can be a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack 116 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 114 can determine the AV's position and orientation (pose) using different methods from multiple systems (e.g., GPS, IMUs, cameras, LiDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LiDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan Wi-Fi network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), BLUETOOTH®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LiDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridesharing service via a ridehailing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LiDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
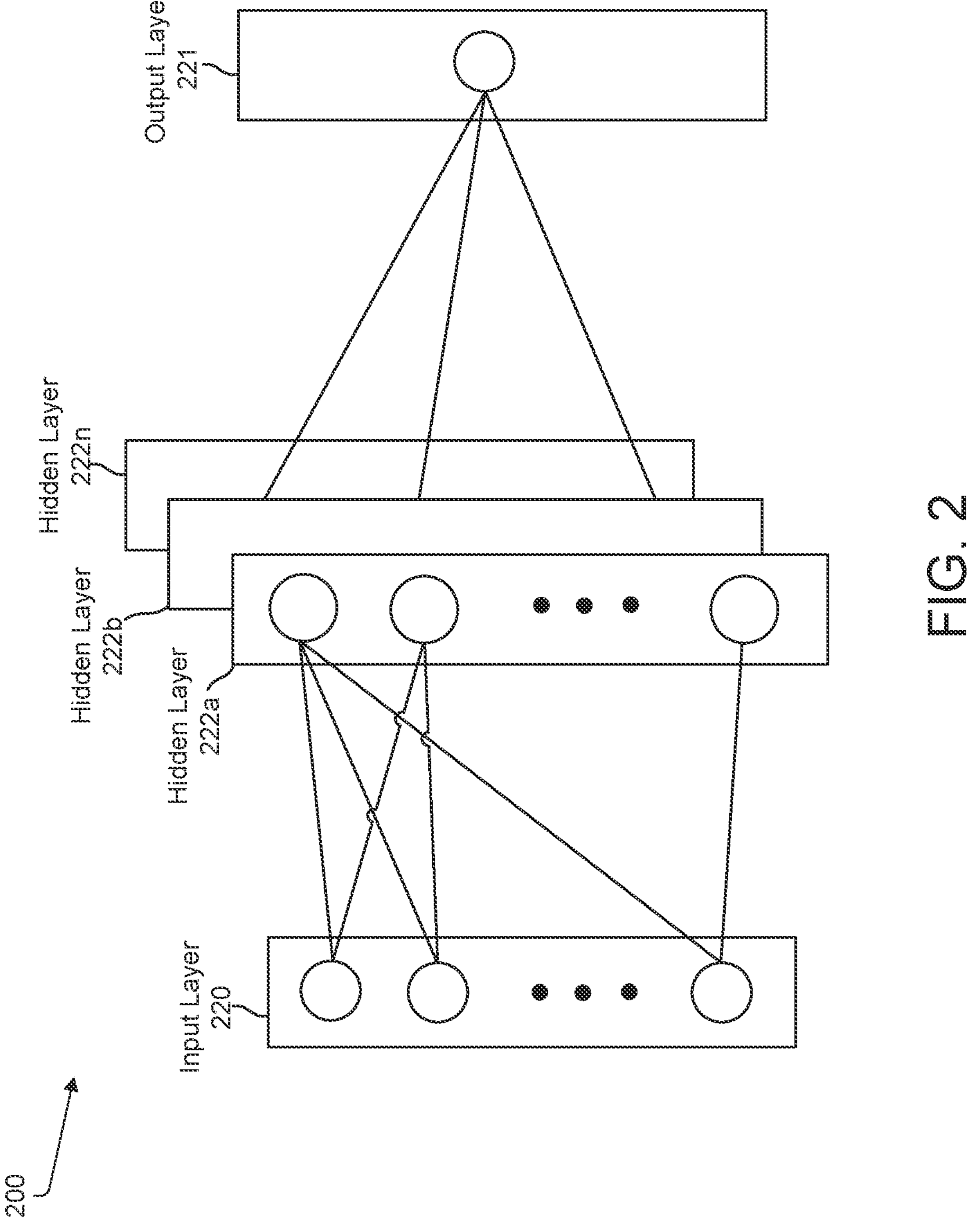
FIG. 2 illustrates an example of a deep learning neural network configured to receive AV sensor data, according to some aspects of the disclosed technology.

In FIG. 2, the disclosure now turns to a further discussion of models that can be used through the environments and techniques described herein. FIG. 2 is a diagram illustrating an example of a neural network 200 that can be used to implement all or a portion of the systems and techniques described herein (e.g., neural network 200 can be used to implement a perception module (or perception system) as discussed above, and receive AV sensor data as described above for object detection and classification). An input layer 220 can be configured to receive sensor data and/or data relating to an environment surrounding a sensor used to capture the sensor data and/or an AV implementing the sensor. Neural network 200 includes multiple hidden layers **222*a*, 222*b*, through 222*n*. The hidden layers 222*a*, 222*b*, through 222*n* include "n" number of hidden layers, where "n" is an integer greater than or equal to one. The number of hidden layers can be made to include as many layers as needed for the given application. Neural network 200 further includes an output layer 221 that provides an output resulting from the processing performed by the hidden layers 222*a*, 222*b*, through 222*n***.

Neural network 200 is a multi-layer neural network of interconnected nodes. Each node can represent a piece of information. Information associated with the nodes is shared among the different layers and each layer retains information as information is processed. In some cases, the neural network 200 can include a feed-forward network, in which case there are no feedback connections where outputs of the network are fed back into itself. In some cases, the neural network 200 can include a recurrent neural network, which can have loops that allow information to be carried across nodes while reading in input.

Information can be exchanged between nodes through node-to-node interconnections between the various layers. Nodes of the input layer 220 can activate a set of nodes in the first hidden layer **222*a*. For example, as shown, each of the input nodes of the input layer 220 is connected to each of the nodes of the first hidden layer 222*a*. The nodes of the first hidden layer 222*a* can transform the information of each input node by applying activation functions to the input node information. The information derived from the transformation can then be passed to and can activate the nodes of the next hidden layer 222*b*, which can perform their own designated functions. Example functions include convolutional, up-sampling, data transformation, and/or any other suitable functions. The output of the hidden layer 222*b* can then activate nodes of the next hidden layer, and so on. The output of the last hidden layer 222*n* can activate one or more nodes of the output layer 221, at which an output is provided. In some cases, while nodes in the neural network 200** are shown as having multiple output lines, a node can have a single output and all lines shown as being output from a node represent the same output value.

In some cases, each node or interconnection between nodes can have a weight that is a set of parameters derived from the training of the neural network 200. Once the neural network 200 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 200 to be adaptive to inputs and able to learn as more and more data is processed.

The neural network 200 is pre-trained to process the features from the data in the input layer 220 using the different hidden layers **222*a*, 222*b*, through 222*n* in order to provide the output through the output layer 221**.

In some cases, the neural network 200 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 200 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 200 can perform a backward pass by determining which inputs (weights) most contributed to the loss of the network, and can adjust the weights so that the loss decreases and is eventually minimized.

The neural network 200 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 200 can include any other deep network, such as an autoencoder, Deep Belief Net (DBN), Recurrent Neural Network (RNN), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 3:
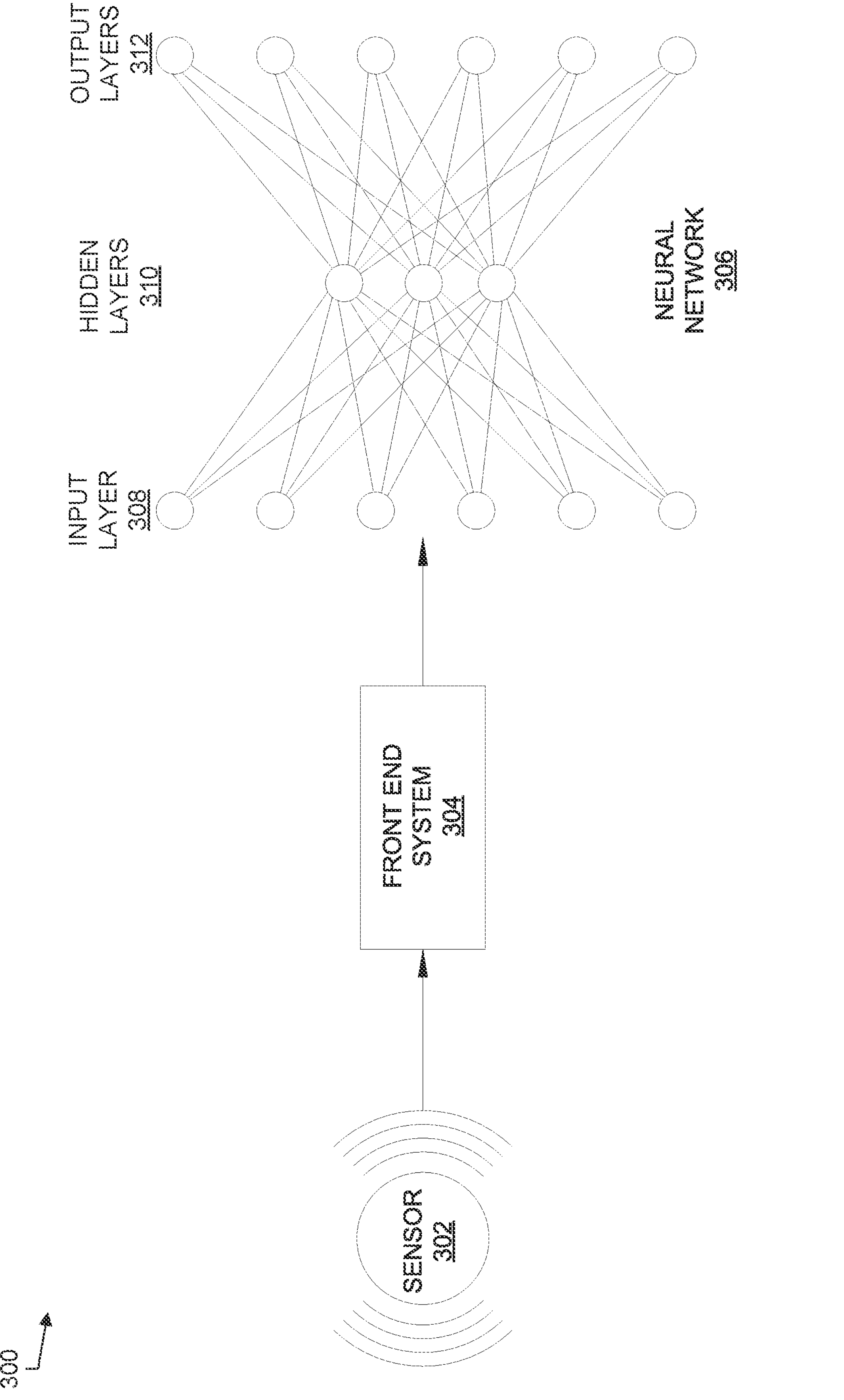
FIG. 3 illustrates an example environment of a neural network receiving data from a sensor via a front end system, according to some examples of the present disclosure.

FIG. 3 illustrates an example environment 300 of a neural network (e.g., deep learning neural network 200) 306 receiving data from a sensor 302 (e.g., sensor systems 104-108 as illustrated in FIG. 1) via a front end system 304, according to some examples of the present disclosure. In this example, the environment 300 may include one or more sensors 302 including, but not limited to, a LiDAR, a RADAR, and/or a camera, where each sensor may capture data pertaining to the real-world environment. In some cases, the sensors 302 can include one or more AV sensors implemented by an AV. By way of example, camera data may be stored by an AV (e.g., stored in local computing device 110) implementing a camera that captured the camera data. The camera data may be stored in the form of one or more frames (e.g., one or more video frames, one or more still images, etc.), where each frame can include multiple pixels. Each pixel may include red, green, and blue (R,G,B) data, where each color value may be represented by a range of values corresponding to the intensity of each color. For example, for an 8-bit image, each color value may have a range between 0 to 255. In some examples, LiDAR data (e.g., captured from the surrounding environment of the AV) may be stored as point cloud data which represents three-dimensional shapes by a set of data points in a three-dimensional coordinate system. The RADAR data may be represented as a list of detections, where each detection is a vector that contains information such as range (e.g., distance of detected object to RADAR sensor), azimuth (e.g., angle of detected object relative to AV's heading direction), elevation (e.g., vertical angle of detected object relative to the AV), and doppler shift (e.g., change in frequency of the returned signal which may be used to calculate the relative speed of the object towards or away from the RADAR sensor).

The sensors 302 may be connected to a front end system 304, which may be responsible for processing the sensor data to transmit to neural network 306. As discussed above, neural network 306 may utilize data from the sensors 302 for one or more tasks such as, for example and without limitation, object detection and classification, tracking, planning, routing, recognition, etc. In some aspects, front end system 304 may include a driver and loader which may be components of the data pipeline used for training and inference. In some aspects, in the context of neural network 306, inference can be the step where a trained neural network 306 is provided input data (e.g., to input layer 308) and its output data (e.g., from output layer 312) is the predictions, decisions, and/or values generated by the neural network 306 based on what the neural network 306 learned during training.

The front end system 304 may include a software component that drives the flow of data from the sensors 302 (e.g., raw sensor data from LiDAR, camera, RADAR) into the data processing pipeline. This may include reading raw sensor data, initializing the data processing, controlling the timing or rate of data input, etc. In another example, front end system 304 may manage communication between the sensors 302 and the software that processes the data from the sensors 302 (e.g., the raw LiDAR, camera, RADAR data).

A loader (also data loader) of front end system 304 may be responsible for preparing and feeding data from the sensors 302 (e.g., one or more slices or frames of sensor data) to neural network 306 during training and/or inference stages. In some aspects, functionalities of the loader may include, but are not limited to, batching, shuffling, parallel loading, pre-processing, etc. By way of example, the data loader can read data from the sensors 302 (e.g., managed by the driver of front end system 304) and perform pre-processing and organize the data from the sensors 302 into batches that are processed by neural network 306. In some cases, pre-processing steps may include, but are not limited to, normalization, augmentation, and reshaping. The loader may also feed data from the sensors 302 to neural network 304 to optimally utilize computational resources.

As described above, a portion or slice of a data frame (e.g., a frame of data can include a frame captured by a camera, LiDAR, RADAR, etc.) can be transmitted (e.g., via a loader of front end system 304) to neural network 306 in addition to a mapping of operations (e.g., as a table of data or any other mapping) for that slice. In other words, a slice of a data frame (e.g., a subset of a data frame) from the sensors 302 can be loaded into input layer 308 along with a mapping of operations for that slice rather than waiting to receive the entire frame of data before providing the data to neural network 306 and/or enabling neural network 306 to start processing the data. For example, as sensors 302 capture data associated with a surrounding environment, slices or portions of a data frame (e.g., from LiDAR, camera, RADAR) can be made available for processing by neural network 306 as such slices or portion of the data frame are received. To illustrate, a camera sensor may capture a row of pixels (e.g., a slice of data and/or row of pixels in a frame captured by the camera sensor) and the loader of front end system 304 may feed the slice of data and/or row of pixels to neural network 306 as the slice of data and/or row of pixels is/are captured by the camera sensor. In addition, the loader of front end system 304 may also feed to neural network 306 a mapping of operations for that slice of data and/or row of pixels, which can identify the operations and order of operations that neural network 306 should apply to the slice of data and/or row of pixels.

The process may repeat for subsequent slices and/or row of pixels (e.g., as the slices and/or row of pixels are received sequentially from the sensors 302) of the data frame (e.g., the next slice and/or row of pixels as it/they is/are captured by the camera sensor). In some examples, the mapping of operations may be a data table that indicates what operations need to be performed by neural network 306 for each data slice in addition to any dependencies. In some cases, the data table may be developed in training or any time prior to inference. For example, for each slice of data, dependencies may indicate the order in which the operations must be performed by neural network 306. In other examples, the mapping of operations can be provided with any other data structure instead of or in addition to a data table, such as a list, a log, an instruction set, a content item, a data object, etc.

In some examples, a slice of data for a LiDAR sensor can include a subset of point cloud data captured by the LiDAR sensor. A three-dimensional point cloud data from a LiDAR sensor may be converted into a depth map, voxelized into grids, and/or transformed into a representation of a surrounding environment, such as a bird's eye view representation of the surrounding environment. The slice of data with respect to a LiDAR sensor may include any subset of data as captured in a moment(s) in time by the LiDAR sensor. In some examples, this process may be implemented and applied to transformers, which is a type of model architecture in neural networks used in natural language processing (NLP) and/or any other type of neural network. In some cases, the process may also be implemented with sliding window transformers.

The operations (e.g., by hidden layers 310) that neural network 306 can perform on each slice of data as it is received (e.g., via the loader) by/from front end system 304 may include, but are not limited to, convolution, pooling or downsampling, activation functions, fully connected layers, output prediction, loss calculation and backpropagation. For example, with respect to convolution, in a convolutional neural network (CNN) which may be used for certain data such as image data, the operations can include convolutions. A pooling operation may be used to reduce spatial dimensions of feature maps by condensing information. The activation functions may be used to introduce non-linearity into neural network 306 which may allow neural network 306 to learn complex patterns. After one or more convolutional and pooling layers, feature maps can be flattened (e.g., converting two-dimensional or higher-dimensional feature maps after the convolution and pooling layers into a one-dimensional vector) and fed into fully connected layers which can learn to make predictions based on the extracted features. With respect to object prediction, output layer 312 may use a system like bounding box regression and class scores. For object classification, output layer 312 may use a softmax function to provide probabilities for each potential classification. For training neural network 306, the output can be compared with ground truth labels, calculating a loss that can represent the discrepancy. This loss can be used in the backpropagation process, which may adjust the neural network's 306 weights to minimize the loss. In some examples, Compute Unified Device Architecture (CUDA) commands may be performed by neural network 306 which may accelerate the training and inference of neural network 306 by performing computations on a Graphics Processing Unit (GPU) instead of a Central Processing Unit (CPU) which may lead to speedups due to the GPU's ability to perform multiple computations simultaneously.

As discussed above, the loader of front end system 304 can be responsible for pre-processing data from the sensors 302. The normalization pre-processing step can standardize the range of input data for neural network 306. In some aspects, in the process as described above with respect to having the loader feed slices of data and a mapping of operations to neural network 306, the normalization step may use the normalization data associated with the previous data frame. Therefore, the loader does not need to wait for the entire data frame to perform the normalization pre-processing step.

Figure 4:
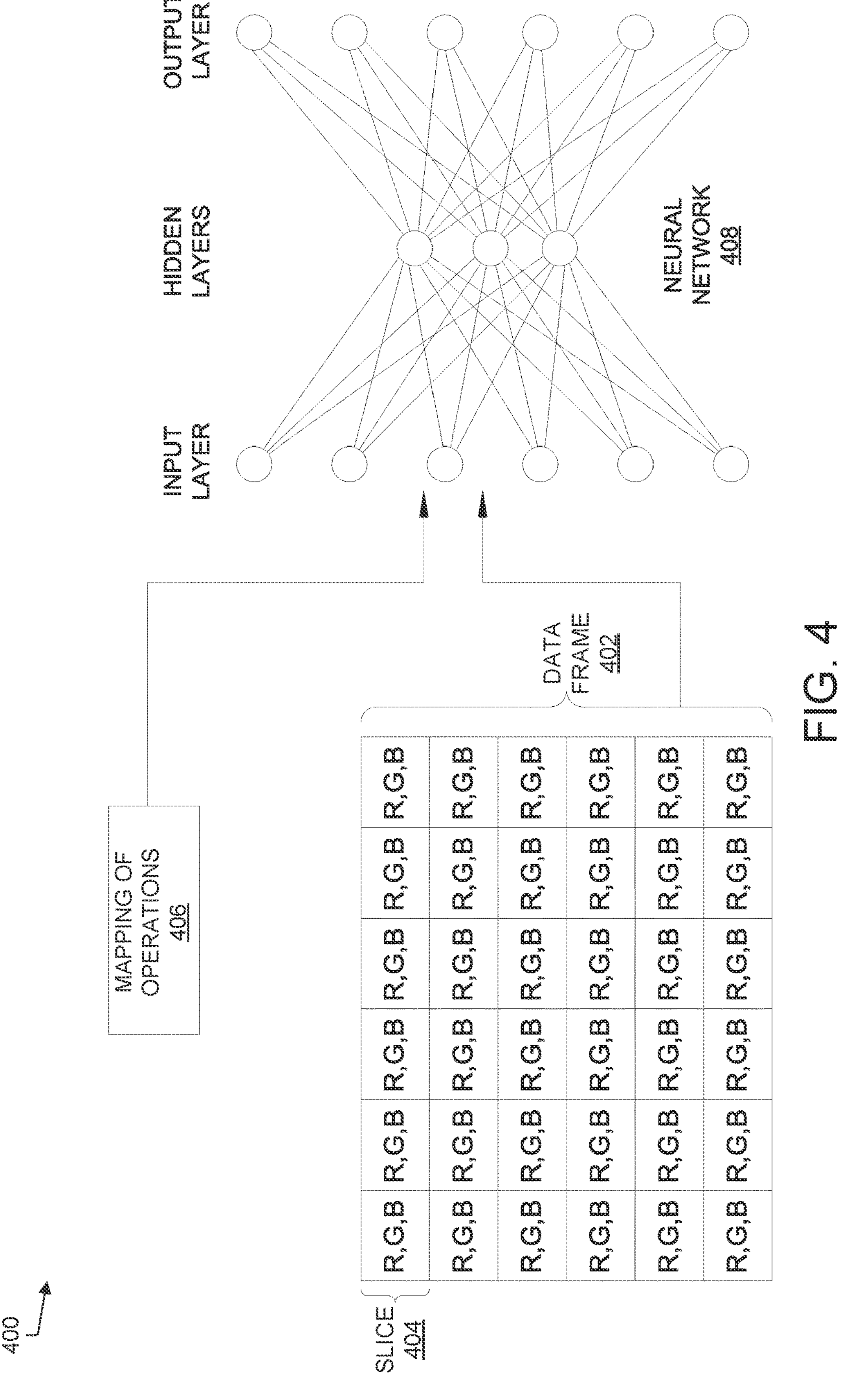
FIG. 4 illustrates an example environment for loading a data frame structure and a mapping of operations into a neural network, according to some examples of the present disclosure.

FIG. 4 illustrates an example environment 400 for loading a data frame 402 structure and a mapping of operations 406 into a neural network 408, according to some examples of the present disclosure. In some examples, data frame 402 as illustrated in FIG. 4 is a data frame from a camera sensor (e.g., from AV sensors 302), where the data frame represents an image captured by the camera. In the example of a camera, data frame 402 may be divided into one or more slices 404, where each slice 404 represents one or more rows of pixels (e.g., each pixel comprises a red (R), green (G), blue (B) parameter). In another example, data frame 402, with respect to a LiDAR sensor (e.g., from AV sensors 302) may be derived from a three-dimensional point cloud, which can be a collection of points that represent the surfaces of scanned objects (e.g., scanned by the LiDAR sensor). In this example, one or more slices 404 may be derived from the point cloud data as it is received by the LiDAR sensor (e.g., data frame 402 may be a snapshot in time as the LiDAR sensor is scanning the environment). In another example, data frame 402, with respect to a RADAR sensor (e.g., from AV sensors 302) may represent a single set of RADAR measurements.

As discussed above, mapping of operations 406 may include a mapping that identifies the operations and dependencies that need to be performed for each slice 404 of data frame 402. For example, consider a scenario of dependencies for a slice 404 of data where operations A and B need to be executed or performed before operation C. In this example, operation C is dependent on operations A and B. The mapping of operations 406 will specify what operations A, B, and C are (e.g., convolution, activation functions, etc. as discussed above with respect to FIG. 3) in addition to the dependencies for each slice 404.

The mapping of operations 406 and slices 404 may be fed (e.g., via a loader) to neural network 408 as each data slice 404 is available or captured by an AV sensor from the environment. As discussed above, mapping of operations 406 may be derived prior to inference (e.g., mapping of operations 406 may be developed in training of neural network 408).

Figure 5:
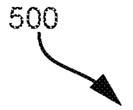
FIG. 5 illustrates an example process for processing data slices via a neural network, according to some examples of the present disclosure.
Figure 5:
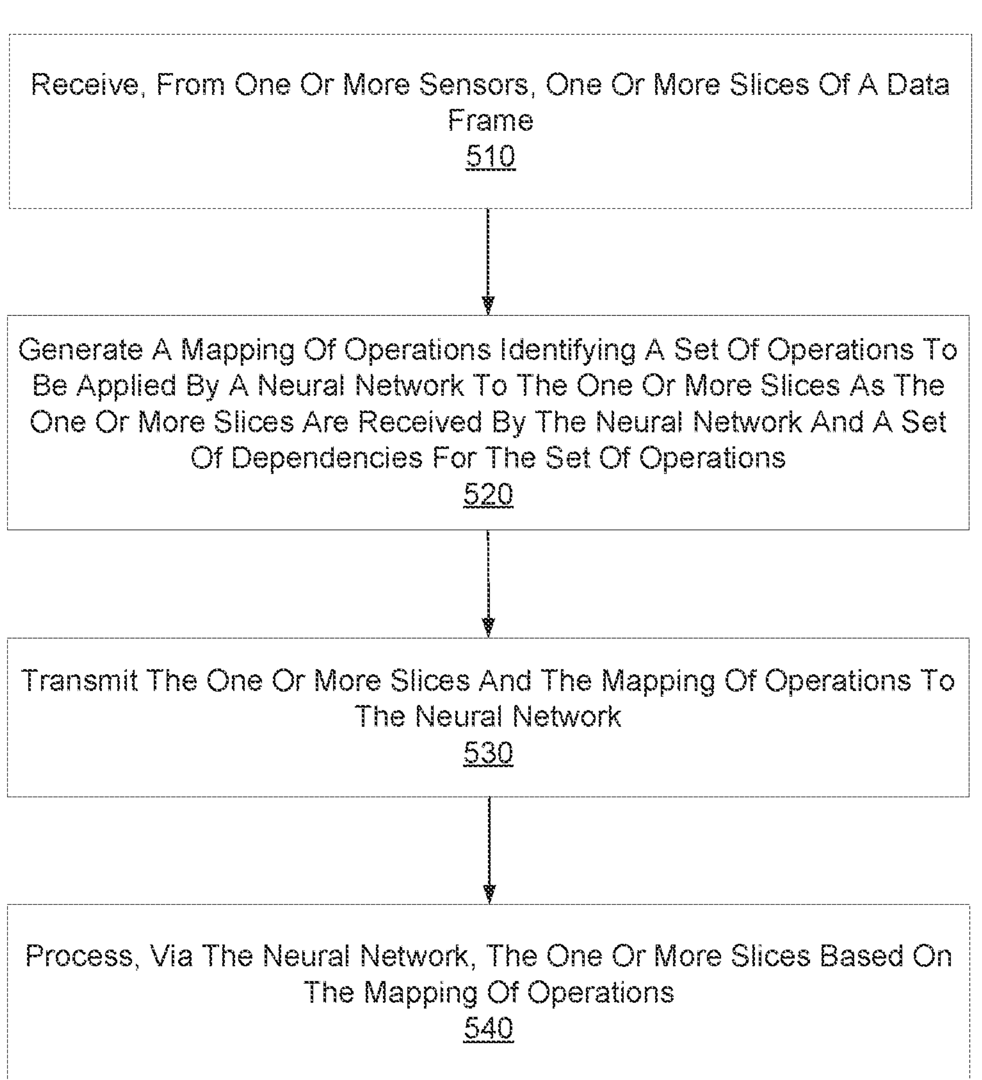

FIG. 5 illustrates an example process 500 for processing data slices via a neural network, according to some examples of the present disclosure. At block 510, the process 500 can include receiving, from one or more sensors, one or more slices of a data frame, and wherein the one or more slices are captured sequentially by the one or more sensors. For example, an AV (e.g., AV 102), may capture data via one or more sensors (e.g., LiDAR, camera, RADAR) located on the AV. The data that is received by the one or more sensors may be in the form of data frames, where each data frame may represent a captured moment in time from each sensor. For example, a data frame of a camera may be an image of the environment. In some examples, for a LiDAR sensor, a single capture of data (e.g., a 360-degree sweep) may be a data frame. As the AV is capturing (e.g., via the sensors the real-world environment) sensor data, portions of the data frame, or slices, may be received sequentially. In other words, the data frames may be comprised of slices (also data slices), where each slice is sequentially received by the one or more sensors. As discussed above, in the example of a camera sensor where a data frame may be an image, a slice may be a row of pixels. In some aspects, the receiving, from one or more sensors, one or more slices of a data frame may be performed without an AV (e.g., received by a computer system and the sensors may not be located on an AV).

At block 520, the process 500 can include generating a mapping of operations identifying a set of operations to be applied by a neural network to the one or more slices as the one or more slices are received by the neural network and a set of dependencies for the set of operations. In some aspects, a front end system comprised of a driver (also data driver) and a loader (also data loader) may control and manage the flow of sensor data (e.g., from the one or more sensors). For example, the driver may manage the raw sensor data from the LiDAR sensor, camera sensor, and RADAR sensor into the data processing pipeline. To illustrate, the driver may read the raw sensor data and control the rate of data input into the neural network. In some cases, the loader may feed the sensor data into the neural network (e.g., deep learning neural network 200). The loader may read the sensor data and perform pre-processing of the sensor data prior to feeding the data into the neural network. As described above, the sensor data may be received in slices, which may be portions of a data frame as the data arrives (e.g., as the AV sensors acquire the data). In some examples, a mapping of operations may be generated to include a set of operations the neural network may perform on each slice (e.g., from each sensor) as the data is fed into the neural network, and also include the dependencies or order of operations the neural network may perform for each data slice. In some examples, the set of dependencies can indicate a first operation from the set of operations that should be applied to the one or more slices before applying a second operation from the set of operations to the one or more slices and/or a sequence in which the set of operations should be applied to the one or more slices.

At block 530, the process 500 can include transmitting the one or more slices and the mapping of operations to the neural network. In some examples, the front end system may feed the data slices (e.g., portions of data frames from LiDAR, camera, RADAR sensors) and the mapping of operations into the neural network. For example, the mapping of operations may include a set of operations the neural network may perform on each slice (e.g., from each sensor) as the data is fed into the neural network, and also include the dependencies or order of operations the neural network may perform for each data slice.

At block 540, the process 500 can include processing, via the neural network, the one or more slices based on the mapping of operations. The neural network may process the slices, or data slices from the one or more sensors on the AV as they are received by the front-end system in addition to the mapping of operations which can designate a mapping of operations and dependencies for each data slice.

Figure 6:
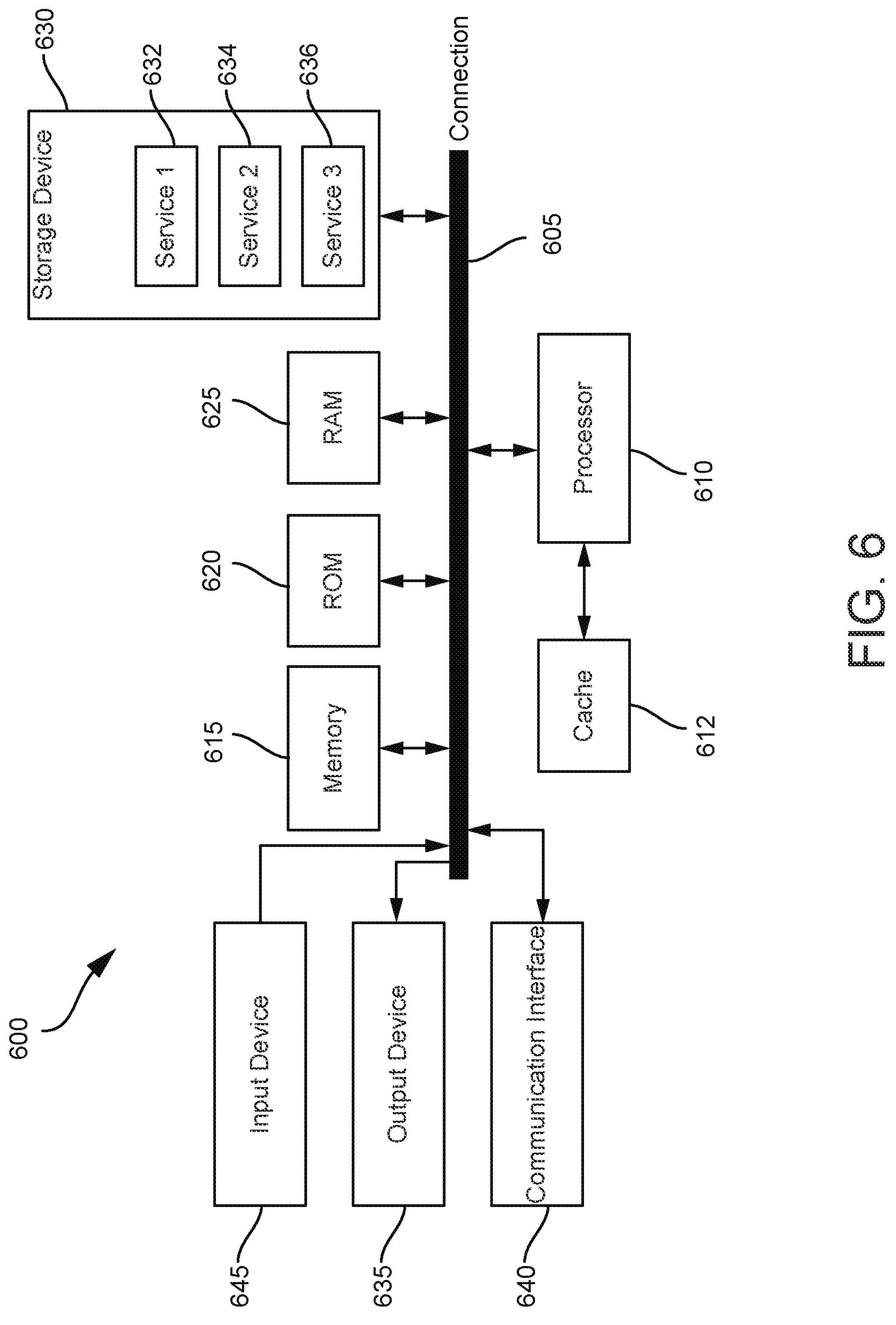
FIG. 6 illustrates an example processor-based system with which some aspects of the subject technology can be implemented, according to some aspects of the present disclosure.

FIG. 6 illustrates an example processor-based system with which some aspects of the subject technology can be implemented. For example, processor-based system 600 can be any computing device making up the local computing device 110 of the AV 102 illustrated in FIG. 1, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: at least one memory; and at least one processor coupled to the at least one memory, the at least one processor configured to: receive, from one or more sensors, one or more slices of a data frame, and wherein the one or more slices are captured sequentially by the one or more sensors; generate a mapping of operations identifying a set of operations to be applied by a neural network to the one or more slices as the one or more slices are received by the neural network and a set of dependencies for the set of operations; transmit the one or more slices and the mapping of operations to the neural network; and process, via the neural network, the one or more slices based on the mapping of operations.

Aspect 2. The system of Aspect 1, wherein the one or more sensors comprises at least one of a Light Detection and Ranging (LiDAR) sensor, a camera sensor, a radio detection and ranging (RADAR) sensor, or a combination thereof.

Aspect 3. The system of any of Aspects 1-2, wherein the mapping of operations is generated by a front end system comprising a driver and a loader.

Aspect 4. The system of Aspect 3, wherein the at least one processor is configured to control, via the driver, a flow of the one or more slices from the one or more sensors into the loader.

Aspect 5. The system of any of Aspects 3-4, wherein the loader processes the one or more slices from the one or more sensors and transmits the one or more slices to the neural network, and wherein the loader processes the one or more slices via a normalization step, wherein the normalization step uses a normalizer from a previous data frame.

Aspect 6. The system of any of Aspects 1-5, wherein the set of dependencies indicate at least one of a first operation from the set of operations that should be applied to the one or more slices before applying a second operation from the set of operations to the one or more slices and a sequence in which the set of operations should be applied to the one or more slices.

Aspect 7. The system of any of Aspects 1-6, wherein the set of operations comprises at least one of convolution, pooling, downsampling, activation functions, fully connected layers, output prediction, loss calculation, backpropagation, or a combination thereof.

Aspect 8. A computer-implemented method comprising: receiving, from one or more sensors, one or more slices of a data frame, and wherein the one or more slices are captured sequentially by the one or more sensors; generating a mapping of operations identifying a set of operations to be applied by a neural network to the one or more slices as the one or more slices are received by the neural network and a set of dependencies for the set of operations; transmitting the one or more slices and the mapping of operations to the neural network; and processing, via the neural network, the one or more slices based on the mapping of operations.

Aspect 9. The computer-implemented method of Aspect 8, wherein the one or more sensors comprises at least one of a Light Detection and Ranging (LiDAR) sensor, a camera sensor, a radio detection and ranging (RADAR) sensor, or a combination thereof.

Aspect 10. The computer-implemented method of any of Aspects 8-9, wherein the mapping of operations is generated by a front end system comprising a driver and a loader.

Aspect 11. The computer-implemented method of Aspect 10, wherein the at least one processor is configured to control, via the driver, a flow of the one or more slices from the one or more sensors into the loader.

Aspect 12. The computer-implemented method of any of Aspects 10-11, wherein the loader processes the one or more slices from the one or more sensors and transmits the one or more slices to the neural network, and wherein the loader processes the one or more slices via a normalization step, wherein the normalization step uses a normalizer from a previous data frame.

Aspect 13. The computer-implemented method of any of Aspects 8-12, wherein the set of dependencies indicate at least one of a first operation from the set of operations that should be applied to the one or more slices before applying a second operation from the set of operations to the one or more slices and a sequence in which the set of operations should be applied to the one or more slices.

Aspect 14. The computer-implemented method of any of Aspects 8-13, wherein the set of operations comprises at least one of convolution, pooling, downsampling, activation functions, fully connected layers, output prediction, loss calculation, backpropagation, or a combination thereof.

Aspect 15. A non-transitory computer-readable storage medium comprising instructions stored thereon which, when executed by a computer or processor cause the computer or processor to perform a method according to any of Aspects 8 to 14.

Aspect 16. A system comprising means for performing a method according to any of Aspects 8 to 14.

Aspect 17. A computer-program product comprising means for performing a method according to any of Aspects 8 to 14.

What is claimed is:

1. A system comprising:

at least one memory; and at least one processor coupled to the at least one memory, the at least one processor configured to:

receive, from one or more sensors, one or more slices of a data frame, and wherein, when the data frame comprises more than one slice, the slices are captured sequentially by the one or more sensors;

generate a mapping of operations identifying a set of operations to be applied by a neural network to the one or more slices as the one or more slices are received by the neural network and a set of dependencies for the set of operations;

transmit the one or more slices and the mapping of operations to the neural network; and process, via the neural network, the one or more slices based on the mapping of operations;

wherein the mapping of operations comprise an explicit dependency graph generated before inference and transmitted with each sequentially captured sensor slice; and wherein the neural network schedules execution for each slice upon receipt according to the dependency graph without waiting for a full data frame.

2. The system of claim 1, wherein the one or more sensors comprises at least one of a Light Detection and Ranging (LiDAR) sensor, a camera sensor, a radio detection and ranging (RADAR) sensor, or a combination thereof.

3. The system of claim 1, wherein the mapping of operations is generated by a front end system comprising a driver and a loader.

4. The system of claim 3, wherein the at least one processor is configured to control, via the driver, a flow of the one or more slices from the one or more sensors into the loader.

5. The system of claim 3, wherein the loader processes the one or more slices from the one or more sensors and transmits the one or more slices to the neural network, and wherein the loader processes the one or more slices via a normalization step, wherein the normalization step uses a normalizer from a previous data frame.

6. The system of claim 1, wherein the set of dependencies indicate at least one of a first operation from the set of operations that should be applied to the one or more slices before applying a second operation from the set of operations to the one or more slices and a sequence in which the set of operations should be applied to the one or more slices.

7. The system of claim 1, wherein the set of operations comprises at least one of convolution, pooling, downsampling, activation functions, fully connected layers, output prediction, loss calculation, backpropagation, or a combination thereof.

8. A computer-implemented method comprising:

receiving, from one or more sensors, one or more slices of a data frame, and wherein, when the data frame comprises more than one slice, the slices are captured sequentially by the one or more sensors;

generating a mapping of operations identifying a set of operations to be applied by a neural network to the one or more slices as the one or more slices are received by the neural network and a set of dependencies for the set of operations;

transmitting the one or more slices and the mapping of operations to the neural network; and processing, via the neural network, the one or more slices based on the mapping of operations;

wherein the mapping of operations comprise an explicit dependency graph generated before inference and transmitted with each sequentially captured sensor slice; and wherein the neural network schedules execution for each slice upon receipt according to the dependency graph without waiting for a full data frame.

9. The computer-implemented method of claim 8, wherein the one or more sensors comprises at least one of a Light Detection and Ranging (LiDAR) sensor, a camera sensor, a radio detection and ranging (RADAR) sensor, or a combination thereof.

10. The computer-implemented method of claim 8, wherein the mapping of operations is generated by a front end system comprising a driver and a loader.

11. The computer-implemented method of claim 10, wherein the at least one processor is configured to control, via the driver, a flow of the one or more slices from the one or more sensors into the loader.

12. The computer-implemented method of claim 10, wherein the loader processes the one or more slices from the one or more sensors and transmits the one or more slices to the neural network, and wherein the loader processes the one or more slices via a normalization step, wherein the normalization step uses a normalizer from a previous data frame.

13. The computer-implemented method of claim 8, wherein the set of dependencies indicate at least one of a first operation from the set of operations that should be applied to the one or more slices before applying a second operation from the set of operations to the one or more slices and a sequence in which the set of operations should be applied to the one or more slices.

14. The computer-implemented method of claim 8, wherein the set of operations comprises at least one of convolution, pooling, downsampling, activation functions, fully connected layers, output prediction, loss calculation, backpropagation, or a combination thereof.

15. A non-transitory computer-readable storage medium comprising at least one instruction for causing a computer or processor to:

receive, from one or more sensors, one or more slices of a data frame, and wherein, when the data frame comprises more than one slice, the one or more slices are captured sequentially by the one or more sensors;

generate a mapping of operations identifying a set of operations to be applied by a neural network to the one or more slices as the one or more slices are received by the neural network and a set of dependencies for the set of operations; and transmit the one or more slices and the mapping of operations to the neural network; and process, via the neural network, the one or more slices based on the mapping of operations;

wherein the mapping of operations comprise an explicit dependency graph generated before inference and transmitted with each sequentially captured sensor slice; and wherein the neural network schedules execution for each slice upon receipt according to the dependency graph without waiting for a full data frame.

16. The non-transitory computer-readable storage medium of claim 15, wherein the one or more sensors comprises at least one of a Light Detection and Ranging (LiDAR) sensor, a camera sensor, a radio detection and ranging (RADAR) sensor, or a combination thereof.

17. The non-transitory computer-readable storage medium of claim 15, wherein the mapping of operations is generated by a front end system comprising a driver and a loader.

18. The non-transitory computer-readable storage medium of claim 17, wherein the at least one processor is configured to control, via the driver, a flow of the one or more slices from the one or more sensors into the loader.

19. The non-transitory computer-readable storage medium of claim 17, wherein the loader processes the one or more slices from the one or more sensors and transmits the one or more slices to the neural network, and wherein the loader processes the one or more slices via a normalization step, wherein the normalization step uses a normalizer from a previous data frame.

20. The non-transitory computer-readable storage medium of claim 15, wherein the set of dependencies indicate at least one of a first operation from the set of operations that should be applied to the one or more slices before applying a second operation from the set of operations to the one or more slices and a sequence in which the set of operations should be applied to the one or more slices.

* * * * *